July 2, 1946.　　DE WITT T. ROSS, JR　　2,403,195
COCKPIT SHIELD
Filed Jan. 10, 1944　　2 Sheets-Sheet 1
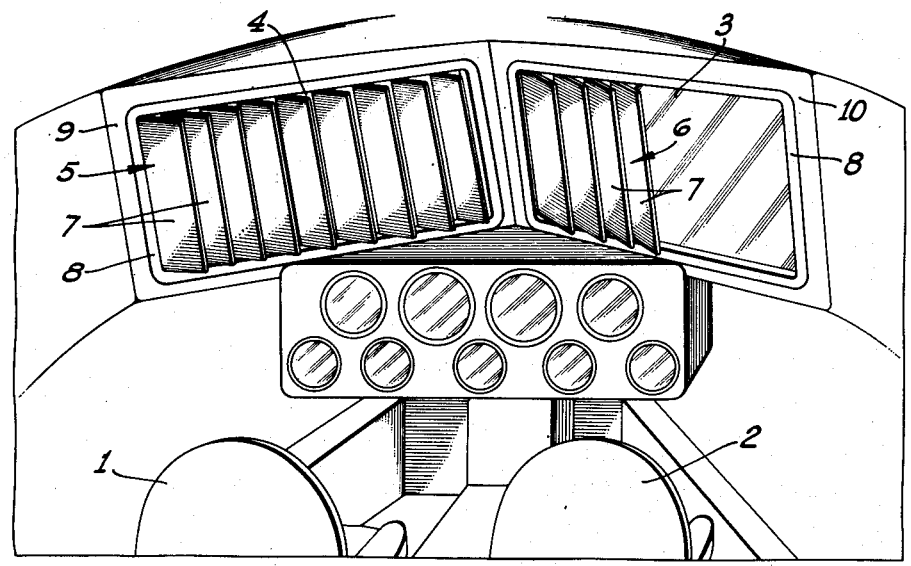
FIG. 1.
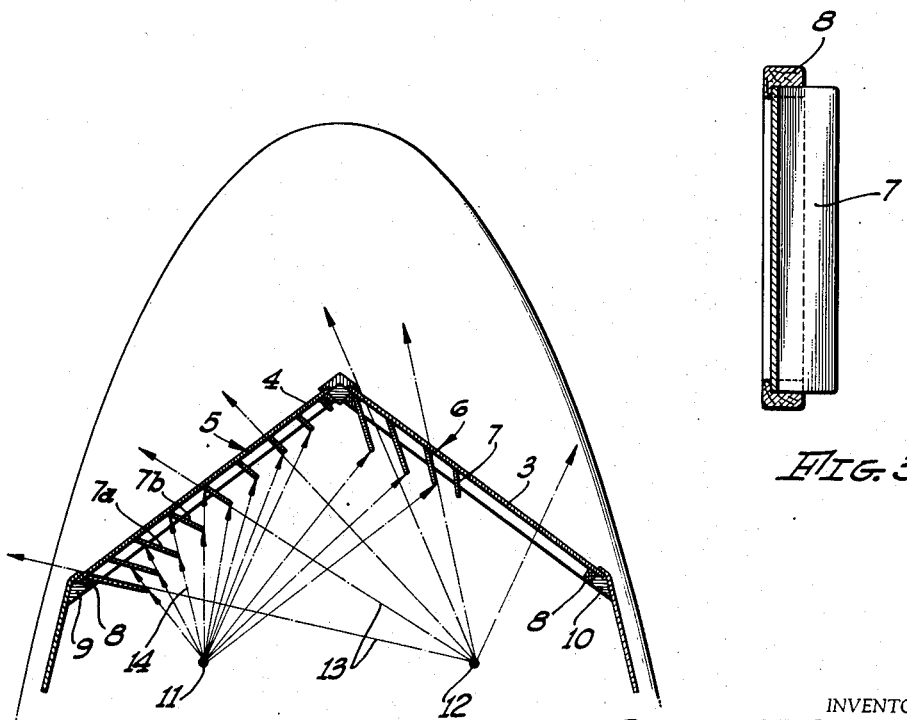
FIG. 2.
FIG. 3.
INVENTOR.
DEWITT T. ROSS, JR.,
BY
ATTORNEY.

July 2, 1946.  DE WITT T. ROSS, JR  2,403,195
COCKPIT SHIELD
Filed Jan. 10, 1944  2 Sheets-Sheet 2

INVENTOR
DE WITT T. ROSS, JR.
BY
ATTORNEY

Patented July 2, 1946

2,403,195

UNITED STATES PATENT OFFICE 2,403,195

COCKPIT SHIELD

De Witt T. Ross, Jr., North Hollywood, Calif.

Application January 10, 1944, Serial No. 517,653

7 Claims. (Cl. 244—121)

My invention relates to a cockpit shield and has particular reference to an attachment device for installation in the windshield openings of aeroplane cockpits and which finds particular utility when employed as an aid to the instruction of student pilots in blind or instrument flying.

Blind flying or the flying of aircraft with the aid of instruments under conditions when it is impossible for the pilot of the aircraft to see either the sky or the ground is an art which requires thorough training before it can be successfully practiced. Unfortunately, there has not yet been found a wholly satisfactory substitute for the training of student pilots under actual blind flying conditions. Preliminary training may be successfully carried out in special training devices but the complete training of the pilot requires actual flying on instruments alone.

Actual flight training under blind flying conditions is, under ordinary circumstances, a hazardous procedure. Many attempts have been made to reduce the hazard by way of providing unlimited vision for permitting the instructor who usually occupies the co-pilot's seat while limiting the student pilot's vision to the interior of the pilot's cockpit.

These attempts have not been successful because any device which has been used prior to my invention for limiting the vision of the student pilot has also undesirably restricted the vision of the instructor, making it necessary to carry also an observer located at some place in the aircraft from which the observer may have absolutely unimpaired vision. Such a location is difficult to find in many types of aircraft and when it can be found, is characterized by the disadvantage of using two trained men in the training of a single student pilot.

One of the prior attempts referred to consisted in the use of red transparent filters or covers for the windshield, the student pilot wearing spectacles with green lenses while the instructor operated without spectacles. While this served to limit the student pilot's vision to the interior of the cockpit, it had the two-fold disadvantage of interfering with the student pilot's vision of the navigation instruments and destroyed the color perception of the instructor, making the training procedure hazardous, particularly at night.

It is an object of the present invention to provide a simple and inexpensive attachment device for the pilot's cockpit of aeroplanes and which will serve to completely limit a student pilot's vision to the interior of the cockpit while at the same time imposing no restriction whatever upon the vision of an instructor occupying an adjacent seat.

It is also an object of my invention to provide a device of the character set forth in the preceding paragraph which includes a series of vertically extending louvers spaced from each other and directed at angles parallel to radial lines emanating from the eye or eyes of an instructor occupying the co-pilot's seat, said louvers being of a sufficient width to completely block the vision of a person occupying the pilot's seat.

It is a still further object of my invention to provide an apparatus of the character set forth in the preceding paragraph in which the louvers are mounted in a removable frame permitting the device to be installed and removed at will from aircraft windshields.

It is an additional object of my invention to provide an apparatus of the character set forth in the preceding paragraphs in which the louvers are mounted for adjustable movement about vertical axes permitting the louvers to be adjusted to conform with variations in seat spacing, windshield location and windshield angle of individual aircraft.

Other objects and advantages of my invention will be apparent from a study of the following specifications, read in connection with the accompanying drawings, wherein:

Fig. 1 is a perspective view of the interior of the pilot's cockpit of an aircraft and illustrating the appearance of the preferred embodiment of my invention when installed on the windshield of such cockpit;

Fig. 2 is a horizontal sectional view through the cockpit shown in Fig. 1 and illustrating the mode of operation of the device of my invention;

Fig. 3 is a cross sectional view through the louvers shown installed in Figs. 1 and 2;

Figure 4:
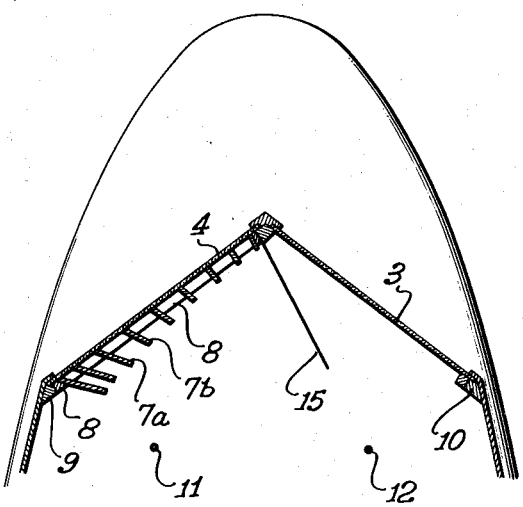
Fig. 4 is a view similar to Fig. 2 but illustrating a modified form of my invention.

Referring to the drawings, I have illustrated in Fig. 1 the interior of a pilot's cockpit of an aircraft. Within the cockpit is mounted a pilot's seat 1 and a co-pilot's seat 2 each facing forwardly and positioned to permit the occupants thereof to see out of the cockpit through cockpit windows 3 and 4.

In most aircraft their windows 3 and 4 are set at an angle to each other and positioned in the form of a V when viewed in plan, this arrangement causing the window surfaces to substantially conform to the streamlined contour of the remainder of the cockpit.

I have also shown in Fig. 1 the preferred embodiment of my invention as comprising two sets of louvers indicated generally by the reference characters 5 and 6. The louvers 5 and 6 preferably comprise thin slit-like members 7 extended vertically and mounted within a frame 8. The frame 8 is made of such size as to permit it to be readily mounted and removed from the windshield opening defined by the windshield frames 9 and 10.

In the form of the invention which is shown in Figs. 1 and 2, the louvers 7 are rigidly mounted within their frames 8 and the louver assembly 5 is somewhat different from the louver assembly 6 principally in that the assembly 5 includes louvers spaced substantially equally along its entire length, whereas in the assembly 6 the louvers 7 are extended over the forward one-half only of the entire window area.

The relative spacing, size and arrangement of the louvers 7 is perhaps best illustrated in Fig. 2. In this figure the point 11 is representative of the location of the eye or eyes of the student pilot being trained, whereas the point 12 represents the eye location of the instructor. Each of the louvers 7 in the assembly 5 and also in the assembly 6 are positioned to each lie parallel to radial lines 13 emanating from the point 12 and representing the various lines of sight of the instructor. With the louvers so positioned, the instructor's vision is substantially unimpaired since each of the louvers 7 is viewed edge on by the instructor. The lateral width of the louvers is made sufficient to overlap the space between the louvers as viewed from the student pilot's eye location 11 so that any radial line of vision emanating from the point 11 as, for example, the line 14 will be cut off by one louver 7a or the adjacent louver 7b and so prevent the student pilot from seeing through the windshields 3 and 4.

With the arrangement described, it will be seen that the instructor is permitted substantially unimpaired vision, both within and exteriorly of the pilot's cockpit. The louvers 7 operate to limit the student pilot's vision solely to the interior of the pilot's cockpit and blocks the student's vision exteriorly of the cockpit in all directions.

In Fig. 4 I have illustrated a modification of the above described invention, wherein only the louver assembly 5 is employed in the pilot's window while vision of the pilot through the window on the co-pilot's side of the cockpit is obscured by means of an opaque curtain 15 of cloth or the like disposed substantially in the position shown, that is, in a plane intersecting the co-pilot's seat, and extending rearwardly a sufficient distance to insure that the pilot will not be permitted vision through the right-hand window of the cockpit.

Figure 5:
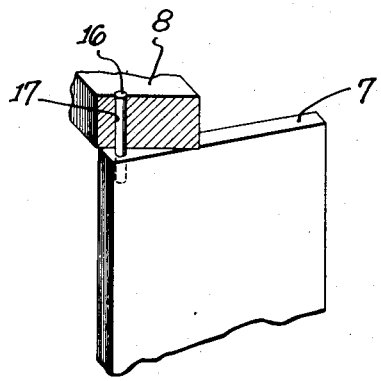
Fig. 5 is a detail perspective view of a portion of the frame and louvers illustrating a modified mounting of the louvers in the frame.

If desired the louver assemblies 5 and 6 may be made identical, in which event the louvers 7 are preferably mounted for adjustable movement about vertical axes as, for example, by providing on the upper and lower ends of each louver a pintle 16 pivotally received within suitable sockets 17 formed in the frames 8 as shown in Fig. 5. With this arrangement, pairs of identical louver assemblies may be mounted in the two windows of an aeroplane cockpit and the same assembly is thus readily adaptable to different types of cockpits and to minor variations in dimensions within a particular type.

It will thus be seen that I have provided a simple and inexpensive cockpit shield which may be readily adapted to various types of aircraft cockpits and which may in a very few minutes be mounted in place in the cockpit windshields or removed therefrom. It will be noted that with the various arrangements described, it is possible to provide for an instructor substantially unimpaired vision exteriorly of the aircraft cockpit, while at the same time absolutely limiting a student pilot's vision to the interior of the cockpit. Thus the device may be used for the training of student pilots in blind or instrument flying and when so used operates to reduce to a minimum the hazards now attendant upon such training.

While for simplicity of description and understanding of the invention, the louvers have been described as extending substantially vertically, it will be apparent that other adaptations of the same device to openings in the floor or belly of a plane may require the extension of the louvers in a horizontal direction without departing from the essence of the invention involved herein.

While I have shown and described the preferred embodiment of my invention, I do not desire to be limited to any of the details of construction shown or described herein, except as defined in the appended claims.

I claim:

1. A cockpit shield for use in an aircraft cockpit having a transparent windshield before a pilot's seat and a co-pilot's seat comprising a series of vertically extending louver members mounted relative to said windshield to obscure vision therethrough from the pilot's seat, said louvers being spaced from each other and lying in vertical planes converging at said copilot's seat, said louvers each having a width such that vertical planes passing through said windshield and said pilot's seat will be cut by at least one of said louvers.

2. A cockpit shield for use in an aircraft cockpit having a transparent windshield before a pilot's seat and a copilot's seat comprising a series of plane vertically extending louver members mounted relative to said windshield to obscure vision therethrough from the pilot's seat, said louvers being spaced from each other and lying in vertical planes passing through said copilot's seat, the width and spacing of said louvers being such as to intersect any vertical plane passed through said pilot's seat and said windshield.

3. A cockpit shield for use in an aircraft cockpit having a pair of transparent windshields disposed at an angle to each other and positioned before a pilot's seat and a copilot's seat comprising a louver assembly for each windshield, each assembly including a series of plane vertically extending louver members mounted relative to said windshield to obscure vision therethrough from the pilot's seat, said louvers being spaced from each other and lying in vertical planes converging at said copilot's seat, the number and width and spacing of said louvers being such as to intersect any vertical plane passed through said pilot's seat and the windshield adjacent thereto and such as to intersect vertical planes passed through said pilot's seat and the forward one-half of the windshield adjacent said copilot's seat.

4. A cockpit shield for use in an aircraft cockpit having a transparent windshield before a pilot's seat and a copilot's seat comprising a frame removably mounted within the windshield opening adjacent said windshield and a series of plane vertically extending louver members mounted in said frame, said louvers being spaced from each other and lying in vertical planes converging at said copilot's seat, said louvers each having a width such that vertical planes passing through said windshields and said pilot's seat will be cut by at least one of said louvers.

5. A cockpit shield for use in an aircraft cockpit having a pair of transparent windshields disposed at an angle to each other and positioned before a pilot's seat and a copilot's seat, comprising a louver assembly for each windshield, each assembly including a frame removably mounted within the windshield opening adjacent said windshield, and a series of plane vertically extending louver members mounted in said frame, said louvers being spaced from each other and lying in vertical planes converging at said copilot's seat, the number and width and spacing of said louvers being such as to intersect any vertical plane passed through said pilot's seat and the windshield adjacent thereto and such as to intersect vertical planes passed through said pilot's seat and the forward one-half of the windshield adjacent said copilot's seat.

6. A cockpit shield for use in an aircraft cockpit having a transparent windshield before a pilot's seat and a copilot's seat comprising a frame removably mounted within the windshield opening adjacent said windshield, and a series of plane vertically extending louver members mounted in said frame, said louvers being spaced from each other and each being mounted in said frame for pivotal movement about vertical axes, whereby each may be adjusted to lie in a vertical plane converging at said copilot's seat, said louvers each having a width such that when so adjusted vertical planes passing through said windshield and said pilot's seat will be cut by at least one of said louvers.

7. A cockpit shield for use in an aircraft cockpit having a pair of transparent windshields disposed at an angle to each other and positioned before a pilot's seat and a copilot's seat, comprising a pair of identical louver assemblies, one for each of said windshields, each of said assemblies including a frame removably mounted within the windshield opening adjacent said windshield, and a series of plane vertically extending louver members mounted in said frame, said louvers being spaced from each other and each being mounted in said frame for pivotal movement about vertical axes, whereby each may be adjusted to lie in a vertical plane converging at said copilot's seat, the number and width and spacing of said louvers being such that when so adjusted they intersect any vertical plane passed through said pilot's seat and the windshield adjacent thereto and intersect vertical planes passed through said pilot's seat and the forward one-half of the windshield adjacent said co-pilot's seat.

DE WITT T. ROSS, JR.